US012710518B2

(12) United States Patent
Kiyono

(10) Patent No.: US 12,710,518 B2
(45) Date of Patent: Aug. 18, 2026

(54) OPTICAL DETECTION APPARATUS AND METHOD FOR DETERMINING OPTICAL AXIS MISALIGNMENT IN OPTICAL DETECTION APPARATUS

(71) Applicant: DENSO CORPORATION, Kariya-city (JP)

(72) Inventor: Mitsuhiro Kiyono, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1029 days.

(21) Appl. No.: 17/822,373

(22) Filed: Aug. 25, 2022

(65) Prior Publication Data

US 2022/0404479 A1 Dec. 22, 2022

Related U.S. Application Data

(63) Continuation of application No. PCT/JP2021/005533, filed on Feb. 15, 2021.

(30) Foreign Application Priority Data

Feb. 26, 2020 (JP) ................................ 2020-029960
Feb. 10, 2021 (JP) ................................ 2021-019781

(51) Int. Cl.
*G01S 7/497* (2006.01)
*G01S 7/481* (2006.01)
(Continued)

(52) U.S. Cl.
CPC .......... *G01S 7/4972* (2013.01); *G01S 7/4817* (2013.01); *G01S 17/931* (2020.01); *G02B 26/101* (2013.01)

(58) Field of Classification Search
None
See application file for complete search history.

(56) References Cited

U.S. PATENT DOCUMENTS 9,537,956 B1 * 1/2017 Sibenac .............. H04W 56/001
2016/0109575 A1 * 4/2016 Oggier .................. G01S 7/4911 356/51

(Continued)

FOREIGN PATENT DOCUMENTS

JP 2007-248056 A 9/2007
KR 20090116024 A 11/2009

*Primary Examiner* — Hovhannes Baghdasaryan
(74) *Attorney, Agent, or Firm* — Precision Patents, P.C.

(57) ABSTRACT

An optical detection apparatus is provided. The optical detection apparatus includes a light emitting unit, a light receiving unit, a storage unit, and a determining unit. The light emitting unit includes a plurality of light-emitting elements. The light receiving unit includes a light-receiving element arrayformed by a plurality of light-receiving pixels, which receive reflected light corresponding to emitted light of the light emitting unit. The storage unit stores a reference light-receiving region on the light-receiving element array corresponding to a location of occurrence of light intensity unevenness included in the emitted light of the light emitting unit. The determining unit determines an optical axis misalignment using a positional displacement between the reference light-receiving region and a detected light-receiving region of light intensity unevenness included in the reflected light of the emitted light on the light-receiving element array.

9 Claims, 12 Drawing Sheets

(51) Int. Cl.
*G01S 17/931* (2020.01)
*G02B 26/10* (2006.01)

(56) References Cited

U.S. PATENT DOCUMENTS

| | | | | |
|---|---|---|---|---|
| 2018/0118201 | A1* | 5/2018 | Matsunaga | B60T 7/12 |
| 2018/0196127 | A1* | 7/2018 | Harada | G01S 7/497 |
| 2019/0265356 | A1 | 8/2019 | Jeno et al. | |
| 2019/0339369 | A1* | 11/2019 | Fenton | G06T 7/001 |
| 2020/0341128 | A1* | 10/2020 | Evans | G01S 7/4972 |
| 2020/0355810 | A1* | 11/2020 | Meng | G01S 7/40 |

* cited by examiner

OPTICAL DETECTION APPARATUS AND METHOD FOR DETERMINING OPTICAL AXIS MISALIGNMENT IN OPTICAL DETECTION APPARATUS

CROSS-REFERENCE TO RELATED APPLICATION

The present application is a continuation application of International Application No. PCT/JP2021/005533, filed Feb. 15, 2021, which claims priority to Japanese Patent Application No. 2020-29960 filed Feb. 26, 2020 and Japanese Patent Application No. 2021-19781 filed Feb. 10, 2021. The contents of these applications are incorporated herein by reference in their entirety.

BACKGROUND

Technical Field

The present disclosure relates to a technique for determining an optical axis misalignment in an optical detection apparatus.

Background Art

A technique of detecting an optical axis misalignment in a ranging apparatus that detects an object that exists ahead or a distance by scanning a laser beam is known.

SUMMARY

In the present disclosure, provided is an optical detection apparatus as the following.

The optical detection apparatus includes: a light emitting unit; a light receiving unit including a light-receiving element array; a storage unit configured to store a reference light-receiving region on the light-receiving element array corresponding to a location of occurrence of light intensity unevenness included in emitted light of the light emitting unit; and a determining unit configured to determine an optical axis misalignment using a displacement between the reference light-receiving region and a detected light-receiving region of light intensity unevenness included in reflected light of the emitted light on the light-receiving element array.

BRIEF DESCRIPTION OF THE DRAWINGS

The above-mentioned and other objects, features, and advantages of this disclosure will become more apparent by reference to the following description taken in conjunction with the accompanying drawings, in which.

DETAILED DESCRIPTION OF THE PREFERRED EMBODIMENTS

Figure 1:
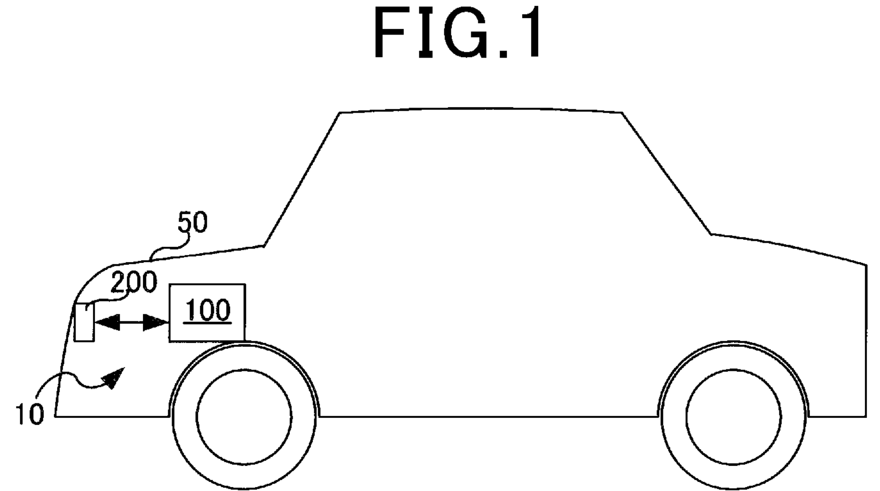
FIG. 1 is an explanatory diagram illustrating an example of a vehicle on which an optical detection apparatus according to a first embodiment is mounted.

Unfortunately, the conventional technique (for example, JP 2007-248056 A) requires the existence of a preceding vehicle as an external reference object to detect an optical axis misalignment. Additionally, in the case in which an optical axis misalignment is detected by the decrease in the intensity of an output signal that is output from the ranging apparatus, time is required until the optical axis misalignment is detected.

Thus, it is desired that an optical axis misalignment in an optical detection apparatus be determined at an early stage with the optical detection apparatus alone.

The present disclosure is achieved in the following aspect.

A first aspect provides an optical detection apparatus. An optical detection apparatus according to the first aspect includes a light emitting unit, a light receiving unit, a storage unit, and a determining unit. The light emitting unit includes a plurality of light-emitting elements. The light receiving unit includes a light-receiving element array formed by a plurality of light-receiving pixels, which receive reflected light corresponding to emitted light of the light emitting unit. The storage unit is configured to store a reference light-receiving region on the light-receiving element array corresponding to a location of occurrence of light intensity unevenness included in the emitted light of the light emitting unit. The determining unit is configured to determine an optical axis misalignment using a displacement between the reference light-receiving region and a detected light-receiving region of light intensity unevenness included in the reflected light of the emitted light on the light-receiving element array.

With the optical detection apparatus according to the first aspect, an optical axis misalignment in the optical detection apparatus is determined at an early stage with the optical detection apparatus alone.

The second aspect provides a method for determining an optical axis misalignment in an optical detection apparatus. The method for determining an optical axis misalignment in an optical detection apparatus according to the second aspect includes acquiring, with a light receiving unit, which includes a light-receiving element array formed by a plurality of light-receiving pixels, which receive reflected light corresponding to emitted light of a light emitting unit including a plurality of light-emitting elements, a detected light-receiving region of light intensity unevenness included in the reflected light of the emitted light on the light-receiving element array; acquiring a reference light-receiving region on the light-receiving element array corresponding to a location of occurrence of light intensity unevenness included in the emitted light, the light-receiving element array being previously prepared; and determining an optical axis misalignment using a displacement between the reference light-receiving region and the detected light-receiving region.

With the method for determining an optical axis misalignment in the optical detection apparatus according to the second aspect, an optical axis misalignment in the optical detection apparatus is determined at an early stage with the optical detection apparatus alone. It should be noted that the present disclosure can be achieved as a program for determining an optical axis misalignment in an optical detection apparatus or a computer-readable storage medium that stores the program.

An optical detection apparatus according to the present disclosure and a method for determining an optical axis misalignment in the optical detection apparatus will be described below in accordance with some embodiments.

First Embodiment

As shown in FIG. 1, an optical detection apparatus 10 for a vehicle according to a first embodiment is mounted and used to, for example, a vehicle 50. The optical detection apparatus 10 includes a Light Detection and Ranging (Lidar) device 200 and a control device 100, which controls the operation of the Lidar device 200. The optical detection apparatus 10 is also called a ranging apparatus and detects the position and the characteristics of an object besides the distance to the object using the Lidar device 200. Additionally, the optical detection apparatus 10 may be used as a detecting unit of a movable body other than the vehicle 50, such as a drone, a robot, or a fixed monitoring device.

Figure 2:
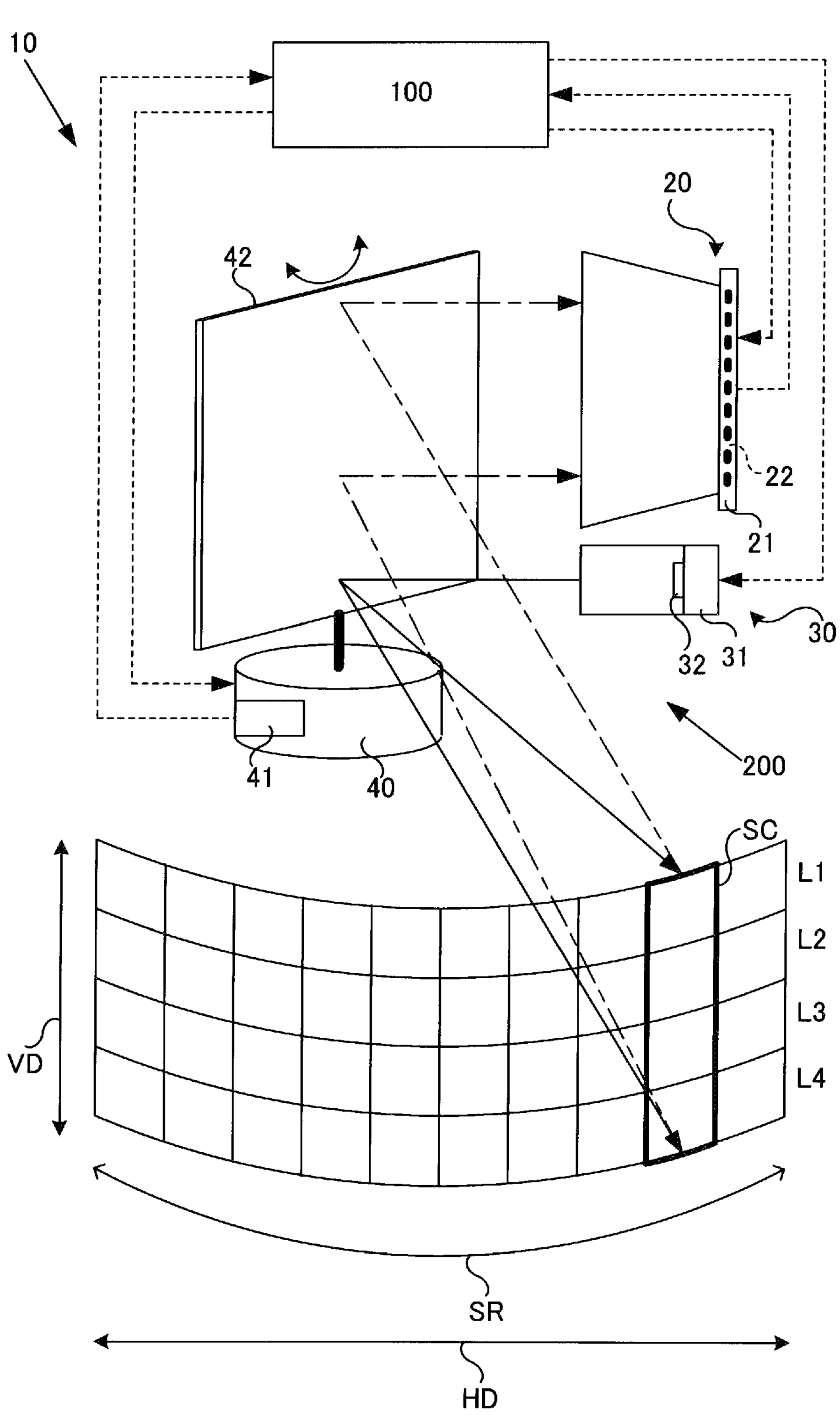
FIG. 2 is an explanatory diagram illustrating the schematic configuration of the optical detection apparatus used in the first embodiment.

As shown in FIG. 2, the optical detection apparatus 10 includes the Lidar device 200 and the control device 100. The Lidar device 200 is a light measuring unit that emits detection light by luminescence and receives the reflected detection light incident on the Lidar device 200. The control device 100 controls the light-emitting operation and the light-receiving operation of the Lidar device 200. The Lidar device 200 and the control device 100 may be accommodated in a physically integrated housing or may be accommodated in different housings. The Lidar device 200 includes a light receiving unit 20, a light emitting unit 30, an electric motor 40, a rotational angle sensor 41, and a scanning mirror 42. The Lidar device 200 with the scanning direction of a horizontal direction HD has a predetermined scan angle range SR in the horizontal direction HD. The scan angle range SR is divided into unit scan angles SC of multiple angles. The light emitting unit 30 emits detection light, and the light receiving unit 20 receives reflected detection light in units of the unit scan angle SC. In this way, detected reflection points over the entire scan angle range SR are acquired, and ranging is performed. The unit scan angle SC determines the resolving power of the Lidar device 200 in the horizontal direction HD or the resolution of the ranging result obtained by the Lidar device 200. The smaller the unit scan angle, that is, the greater the number of the detected reflection points, the higher the resolving power and the resolution. The Lidar device 200 acquires the detection points in units of the unit scan angle SC, that is, performs the light-emitting and light-receiving processes, while scanning in one direction across the scan angle range SR or scanning back and forth in both directions across the scan angle range SR. The scan angle range SR may be divided into multiple rows in a vertical direction VD in accordance with the configuration of light-receiving elements of the light receiving unit 20 or a light-receiving procedure. In an example illustrated in FIG. 2, the scan angle range SR is divided into four rows L1 to L4. The scanning direction of the optical detection apparatus 10 may be the vertical direction VD. In this case, the optical detection apparatus 10 has the predetermined scan angle range SR in the vertical direction VD. Note that, the terms horizontal and vertical refers to the position of the optical detection apparatus 10 in the mounted state, and the vertical direction refers to a direction that is perpendicular to a horizontal plane. The same applies to the vertical direction VD and the horizontal direction HD in the following description.

Figure 3:
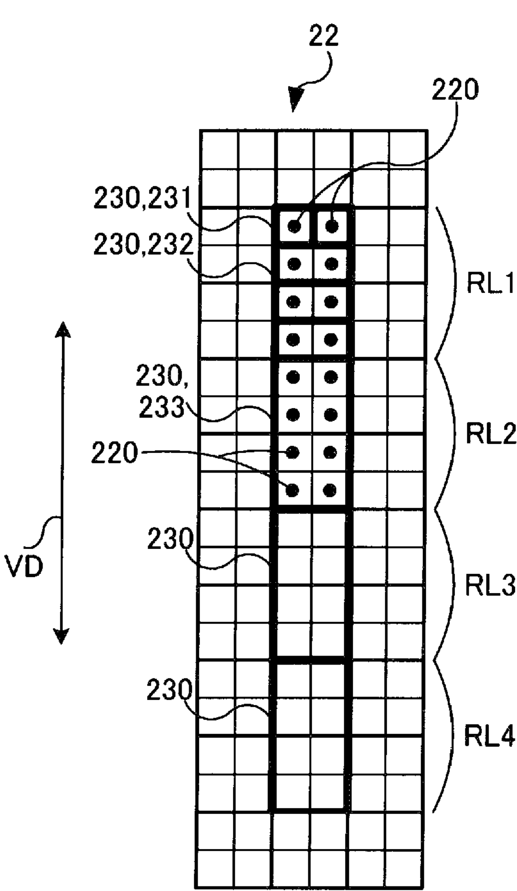
FIG. 3 is an explanatory diagram schematically illustrating a light-receiving element array used in the first embodiment.

The light receiving unit 20 includes a light reception control unit 21, a light-receiving element array 22, and a non-illustrated light-receiving lens. The light receiving unit 20 executes a light-receiving process of outputting a detection signal indicating a detection point in response to the reception of the reflected detection light corresponding to the detection light emitted from the light emitting unit 30. The light receiving unit 20 also executes a light-receiving process of outputting background light image data in response to the reception of environmental light that enters regardless of the reflection from the light emitting unit 30. The environmental light includes light that is not detection light from the light emitting unit 30, that is, ambient light of the surrounding atmosphere that comes from sunlight or illumination light, and reflected light or scattered light from surrounding objects irradiated by sunlight or illumination light. As shown in FIG. 3, the light-receiving element array 22 is a plate-like optical sensor on which multiple light-receiving elements 220 are arranged in a matrix, that is, in the directions corresponding to the horizontal direction HD and the vertical direction VD of the scan angle range SR. The light-receiving elements are configured by, for example, single-photon avalanche diodes (SPADs) or other photodiodes. Note that, the term light-receiving pixel 230 is sometimes used as the minimum unit in the light-receiving process, that is, as the light-receiving unit corresponding to a detection point. The light-receiving unit means either a light-receiving pixel 231 constituted by a single light-receiving element or light-receiving pixels 232 and 233 constituted by multiple light-receiving elements. The present embodiment uses the light-receiving element array 22 including the light-receiving pixels 230 each including one light-receiving element in the vertical direction VD such as 1 by 1 light-receiving pixels 231 or 1 by 2 light-receiving pixels 232. In the light-receiving element array 22, as the number of the light-receiving elements constituting each light-receiving pixel, that is, the light-receiving unit is reduced, the number of the light-receiving units, that is, the detection points is increased. In the present embodiment, the light-receiving element array 22 includes light-receiving pixel rows RL1, RL2, RL3, and RL4, which correspond to the four rows L1, L2, L3, and L4 of the scan angle range SR from the top in the vertical direction VD. Each of the light-receiving pixel rows RL1, RL2, RL3, and RL4 includes multiple light-receiving pixels 230. That is, in the present embodiment, among the light-receiving elements 220 included in the light-receiving element array 22, the groups of the light-receiving pixels 230 corresponding to the light-receiving pixel rows RL1, RL2, RL3, and RL4 are used for the light-receiving process.

The light reception control unit 21 executes the light-receiving process of outputting an incident light intensity signal corresponding to the amount of incident light or the intensity of incident light using the light-receiving pixels 230 corresponding to the light-receiving pixel rows RL1 to RL4. The light-receiving process is executed in units of the unit scan angle SC, that is, per the column corresponding to the unit scan angle SC in response to the emission of detection light by the light emitting unit 30. Specifically, the light reception control unit 21 uses all the light-receiving pixels 230 to acquire the current generated by the light-receiving elements that constitute each light-receiving pixel 230 in accordance with the incident light amount or the voltage converted from the current per the unit scan angle SC and outputs the current or the voltage as the incident light intensity signal to the control device 100. Alternatively, when the light emitting unit 30 performs light emission corresponding to each row of the scan angle range SR, the light reception control unit 21 selects the light-receiving pixels 230 corresponding to the row in which light is emitted and outputs the current or the voltage as the incident light intensity signal to the control device 100. The incident light intensity signal may be output to the control device 100 per unit scan each SC, or the incident light intensity signal corresponding to the scan angle range SR may be output to the control device 100 when the scanning across the scan angle range SR is completed. Note that, the incident light intensity signal corresponding to the total number of photons received by the light-receiving elements that constitute each light-receiving pixel 230 may be output to the control device 100. In general, since the incident light amount obtained by one light-receiving element 220 is small with the SPAD, the incident light intensity signals from eight light-receiving elements 220 as in the light-receiving pixel 230 may be added up using a non-illustrated adder for each light-receiving element row RL1 to RL4. This improves the signal-to-noise ratio (S/N). A ranging functional unit that performs ranging of the detection point using, for example, time of flight (ToF) may be integrally provided as a circuit of the light reception control unit 21 or may be provided as a program executed by the control device 100 as will be described later.

The light emitting unit 30 includes a light emission control unit 31, a light-emitting element 32, and a collimator lens and emits detection light in units of the unit scan angle SC once or discretely multiple times. The light-emitting element 32 includes, for example, one or more infrared laser diodes and outputs an infrared laser beam as the detection light. The light emitting unit 30 may include, in the vertical direction, a single light-emitting element or multiple light-emitting elements. When multiple light-emitting elements are provided, the light emission control unit 31 may switch the light-emitting elements that will emit light in accordance with scan timing. In response to the light emission control signal that is input per unit scan angle from the control device 100 and that instructs the light emission of the light-emitting element, the light emission control unit 31 drives the light-emitting element by a drive signal having a pulse-driven waveform and causes an infrared laser beam to be emitted. The infrared laser beam emitted from the light emitting unit 30 is reflected by the scanning mirror 42 and directed outside the Lidar device 200, that is, toward the region in which detection of objects is desired.

Figure 4:
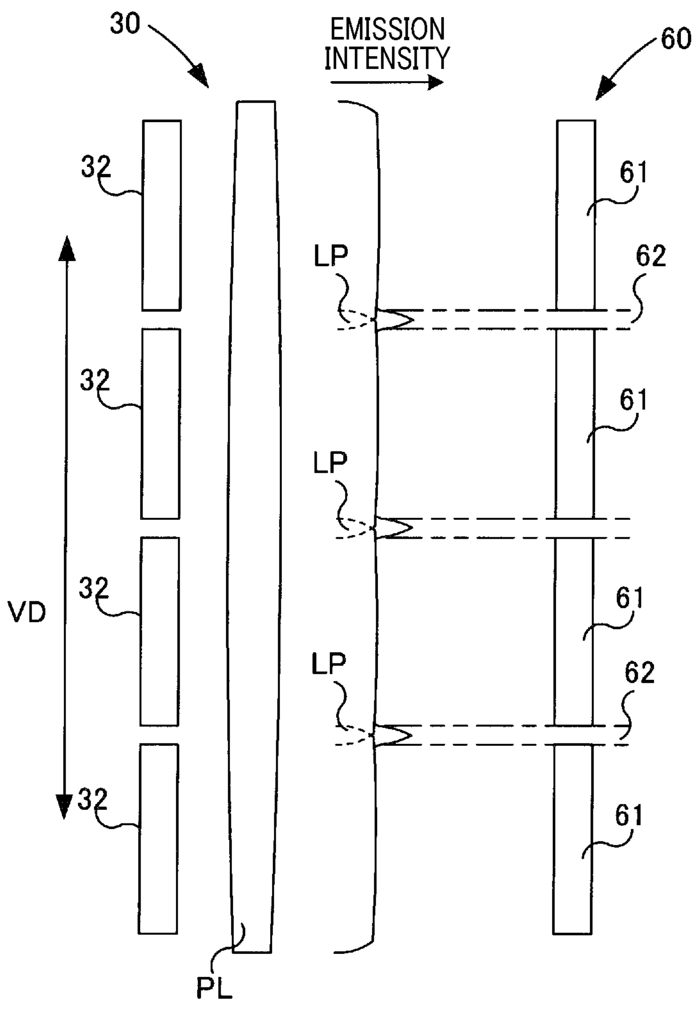
FIG. 4 is an explanatory diagram illustrating the relationship between conventional light-emitting elements, light-receiving pixels, and emission intensity.
Figure 5:
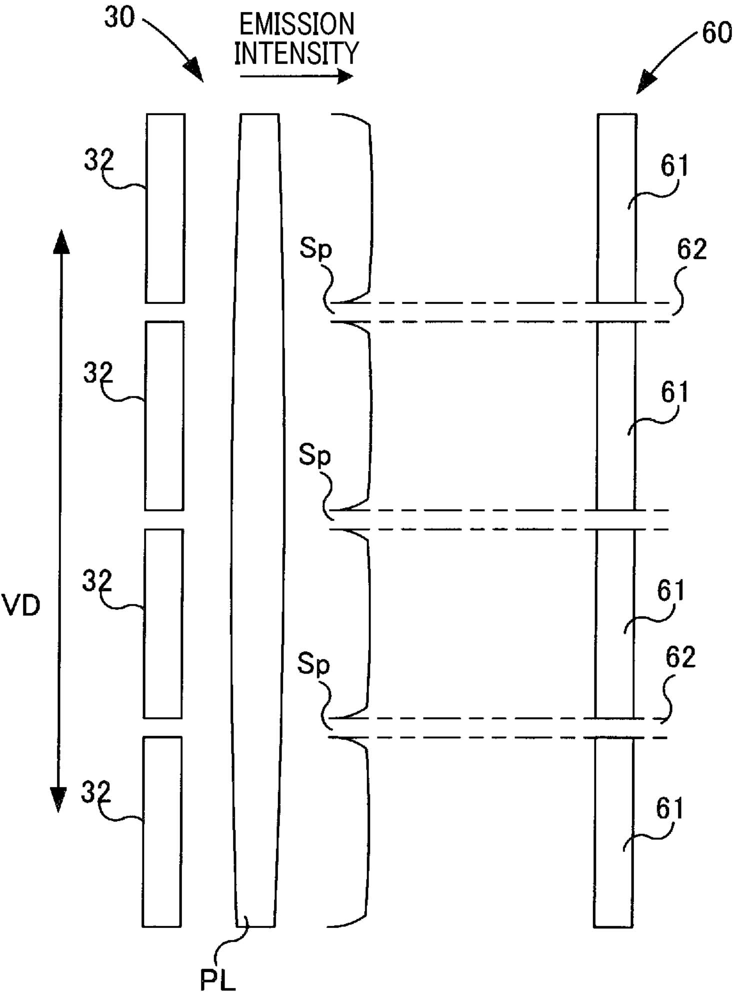
FIG. 5 is an explanatory diagram illustrating the relationship between the conventional light-emitting elements, light-receiving pixels, and emission intensity.
Figure 6:
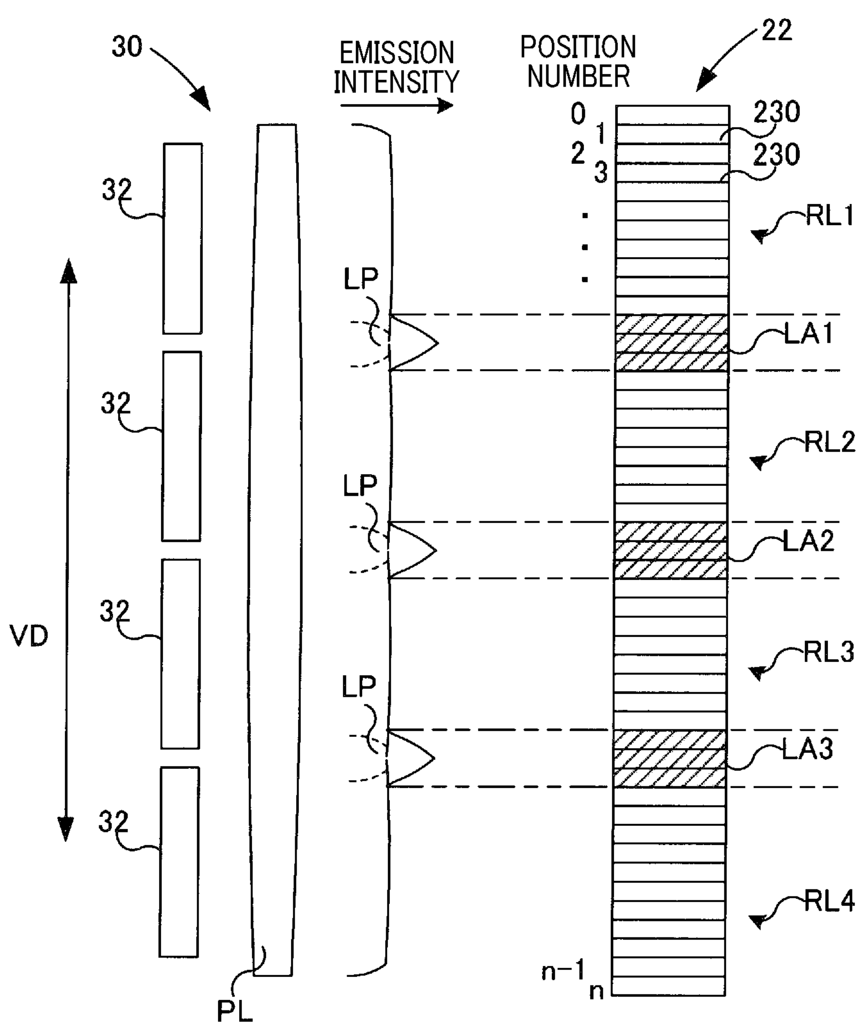
FIG. 6 is an explanatory diagram illustrating the relationship between light-emitting elements, light-receiving pixels, and emission intensity of the optical detection apparatus according to the first embodiment.

The relationship of the emitted light from the light emitting unit and the reflected light corresponding to the emitted light with respect to the light-receiving position of the reflected light on the light-receiving element array will be described using FIGS. 4 to 6. FIGS. 4 and 5 illustrate a conventional example, and FIG. 6 illustrates an example of the present embodiment. Note that, since there is no difference between the light emitting units of the conventional example and the example of the present embodiment, reference numerals used in the present embodiment are given and described. The light emitting unit 30 includes multiple light-emitting elements 32 in the vertical direction VD, and, for example, four light-emitting elements 32 are arranged as shown in FIGS. 4 to 6. FIG. 6 illustrates the light-receiving pixels 230 used for the light-receiving process extracted from the light-receiving element array 22 shown in FIG. 3. The emitted light beams emitted from the light-emitting elements 32 are combined by the collimator lens PL and emitted outward from the optical detection apparatus 10. The state of the emission intensity of the emitted light beams that are combined is as follows. When the irradiated regions of two adjacent light-emitting elements 32 overlap each other, the emission intensity in an overlapped region LP is higher than the emission intensity of other irradiated regions that are not overlapped. When the irradiated regions of two adjacent light-emitting elements 32 do not overlap each other, that is, when an unirradiated region Sp is formed, the emission intensity in the unirradiated region Sp is lower than the emission intensity of the irradiated regions. The existence of high and low intensities, that is, the existence of the overlapped regions LP and the unirradiated regions Sp forms light intensity unevenness. A conventional light-receiving element array 60 includes, for example, four light-receiving pixels 61 in accordance with the arrangement direction of the light-emitting elements 32. The light-receiving pixels 61 are arranged with gaps 62 formed in between so as not to overlap with the overlapped regions LP or the unirradiated regions Sp, that is, at positions not facing the overlapped regions LP or the unirradiated regions Sp. Conventionally, this structure inhibits the variation in the light-receiving signal caused by the light intensity unevenness and the decrease in the ranging accuracy caused by the variation in the light-receiving signal.

In contrast, in the example of the present embodiment, the light-receiving element array 22 is arranged without a gap in accordance with the arrangement direction of the light-emitting elements 32. That is, the light-receiving element array 22 includes multiple light-receiving pixels 230 so as to receive the reflected light corresponding to the overlapped regions LP or the unirradiated regions Sp. More specifically, the light-receiving element array 22 of the present embodiment includes multiple light-receiving pixels 230 arranged in each of the light-receiving positions, that is, light-receiving regions LA1, LA2, and LA3, corresponding to the overlapped regions LP included in the irradiated region by the light-emitting elements 32. The light-receiving positions corresponding to the overlapped regions LP, that is, the light-receiving regions LA1 to LA3 each include multiple light-receiving pixels 230. For example, each of the light-receiving regions LA1 to LA3 may be formed by multiple light-receiving pixels 230 included in one of the adjacent light-receiving pixel columns. Alternatively, each of the light-receiving regions LA1 to LA3 may be formed by one or more light-receiving pixels 230 included in each of the adjacent light-receiving pixel rows RL1 and RL2, RL2 and RL3, and RL3 and RL4. In the example of FIG. 6, each light-receiving pixel 230 includes one light-receiving element 220 in the vertical direction corresponding to the arrangement direction of the light-emitting elements 32. As a result, the dimension of each light-receiving pixel 230 in the vertical direction VD is equal to the height of one light-receiving pixel 220. As long as multiple light-receiving pixels 230 are arranged in the light-receiving regions LA1, LA2, and LA3, light-receiving pixels 230 each including two or more light-receiving elements 220 may be provided in the vertical direction corresponding to the arrangement direction of the light-emitting elements 32. That is, the light-receiving pixel 230 only needs to be set to the dimension so that light is received by multiple light-receiving pixels 230 in each overlapped region LP that is the cause of the light intensity unevenness included in the reflected light. The dimension of the light-receiving pixel 230, that is, the length in the vertical direction VD is, for example, tens of μm. In contrast, the length of the conventional light-receiving element in the vertical direction VD is, for example, hundreds of which is longer by an order of magnitude. Note that, the multiple light-receiving pixels 230 may also be associated with the unirradiated regions Sp in the same manner.

The electric motor 40 includes a non-illustrated electric motor driver. The electric motor 40 is provided with the rotational angle sensor 41 for detecting the rotational angle of the electric motor 40. The electric motor driver changes the applied voltage to the electric motor 40 upon receipt of a rotational angle instruction signal, which is output from the control device 100 in response to the input of a rotational angle signal from the rotational angle sensor 41, and controls the rotational angle of the electric motor 40. The electric motor 40 is, for example, an ultrasonic motor, a brushless motor, or a brush motor and includes a known mechanism for causing a reciprocal motion in the scan angle range SR. The scanning mirror 42 is mounted on the distal end portion of the output shaft of the electric motor 40. The scanning mirror 42 is a reflector, that is, a mirror, that scans the detection light emitted from the light-emitting element 32 in the horizontal direction HD. The scanning mirror 42 is reciprocally driven by the electric motor 40, so that the scan angle range SR is scanned in the horizontal direction HD. One reciprocal scan by the scanning mirror 42 is called one frame, which is a detection unit of the Lidar device 200. The light emitting unit 30 emits the detection light in accordance with the movement of the scanning mirror 42 in one direction or the reciprocal movement. That is, the object detection by the Lidar device 200 can only be performed in one or two directions in the scan angle range SR. The scanning mirror 42 scans the detection light and receives the reflected light in a scan angle range of, for example, 120 degrees or 180 degrees. The scanning mirror 42 may scan in the vertical direction VD instead of the horizontal direction HD. Alternatively, the scanning mirror 42 may scan in the vertical direction VD in addition to the horizontal direction HD. That is, the scanning position may be changed in the vertical direction VD. To enable the scanning in the horizontal direction HD and the vertical direction VD, the scanning mirror 42 may be a multifaceted mirror such as a polygon mirror. Alternatively, the scanning mirror 42 may be a single-faceted mirror equipped with a mechanism that swings in the vertical direction VD or may include another single-faceted mirror that swings in the vertical direction VD. The scanning mirror 42 may be rotated by the electric motor 40 to perform rotational scanning. In this case, the light-emitting and light-receiving processes only need to be performed by the light emitting unit 30 and the light receiving unit 20 corresponding to the scan angle range SR. Furthermore, for example, with the scan angle range SR of approximately 60 degrees, the scanning mirror 42 may be omitted, and a light-receiving element array having a lateral width corresponding to the scan angle range SR may be provided. The light-receiving element array may sequentially select the row and column to detect an object, that is, to perform the ranging process.

The detection light emitted from the light emitting unit 30 is reflected by the scanning mirror 42 and is scanned across the scan angle range SR in the horizontal direction in units of the unit scan angle SC. The reflected detection light, which is the detection light reflected by a target object, is reflected to the light receiving unit 20 by the scanning mirror 42 and enters the light receiving unit 20 per unit scan angle SC. The light receiving unit 20 executes the light-receiving process per column in accordance with the timing light is emitted by the light emitting unit 30. The unit scan angle SC at which the light-receiving process is executed is sequentially incremented. This enables scanning for the light-receiving process across a desired scan angle range SR. The light emitting unit 30 and the light receiving unit 20 may be rotated by the electric motor 40 together with the scanning mirror 42. Alternatively, the light emitting unit 20 and the light receiving unit 30 may be separate from the scanning mirror 42 and do not necessarily have to be rotated by the electric motor 40. Furthermore, the scanning mirror 42 may be omitted, and multiple light-receiving pixels arranged in an array corresponding to the scan angle range SR or the light-receiving element array 22 may be provided. In this case, a laser beam is directly emitted sequentially to the outside and the reflected light is directly received by sequentially switching the light-receiving pixels.

Figure 7:
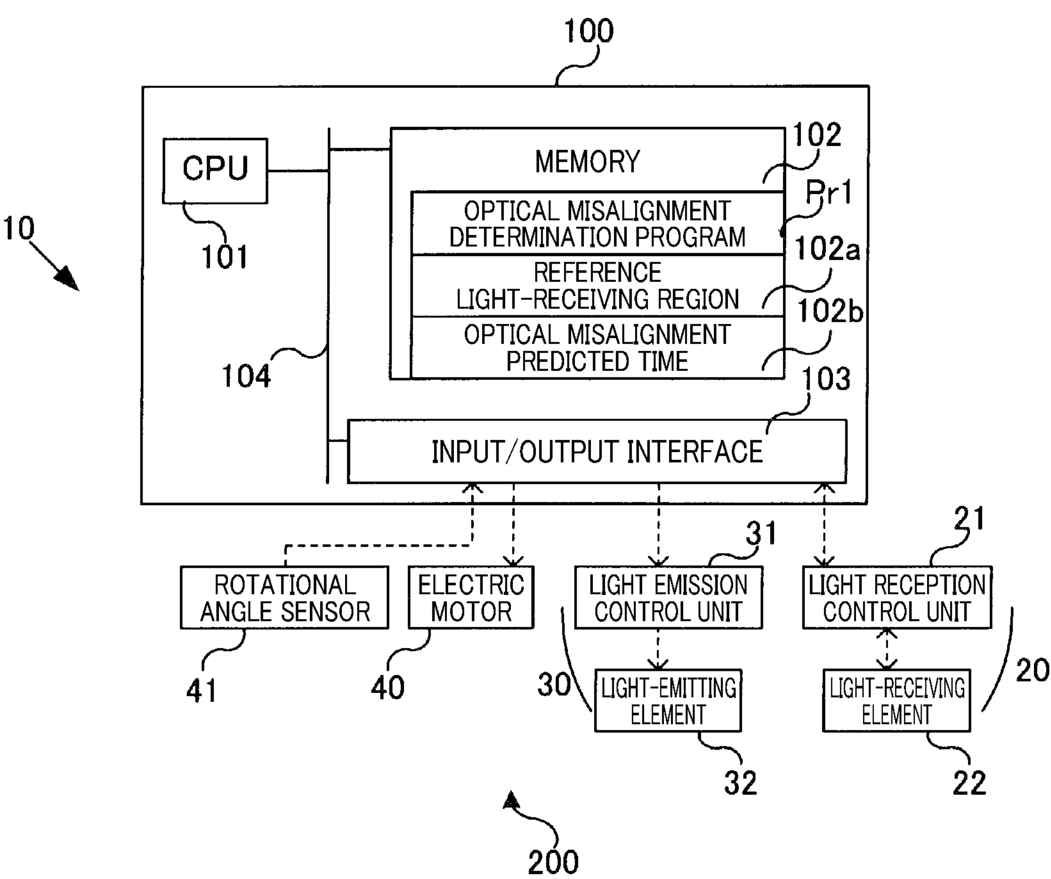
FIG. 7 is a block diagram illustrating the functional configuration of the optical detection apparatus according to the first embodiment.

As shown in FIG. 7, the control device 100 includes a computation unit, which is a central processing unit (CPU) 101, a storage unit, which is a memory 102, an input/output unit, which is an input/output interface 103, and a non-illustrated clock generator. The CPU 101, the memory 102, the input/output interface 103, and the clock generator are connected to each other through an internal bus 104 to allow two-way communication. The memory 102 includes a memory, which is a storage unit that stores an optical axis misalignment determination program Pr1 for executing an optical axis misalignment determination process in a non-volatile read-only manner, such as a read-only memory (ROM), and a memory that is readable and writable by the CPU 101, such as a random-access memory (RAM). The non-volatile read-only area of the memory 102 includes a reference light-receiving region storage area 102*a*, which stores a reference light-receiving region RP that serves as the reference in determining an optical axis misalignment, and an optical axis misalignment predicted time storage area 102*b*, which stores the predicted time of an optical axis misalignment. The non-volatile read-only area may be rewritable in updating the program or updating the reference value. The CPU 101, that is, the control device 100 functions as a determining unit by deploying the optical axis misalignment determination program Pr1 stored in the memory 102 to the readable and writable memory and executing it. Note that, the CPU 101 may be a single CPU or may be multiple CPUs that execute respective programs. Alternatively, the CPU 101 may be a multi-tasking or multi-threading CPU that is capable of executing multiple programs simultaneously.

The input/output interface 103 is connected to the light reception control unit 21, which constitutes the light receiving unit 20, the light emission control unit 31, which constitutes the light emitting unit 30, the electric motor 40, and the rotational angle sensor 41 through control signal lines. The input/output interface 103 transmits a light emission control signal to the light emission control unit 31, transmits a light reception control signal to the light reception control unit 21, and receives an incident light intensity signal from the light reception control unit 21. The light reception control signal instructs the light reception control unit 21 to execute the light-receiving process for detecting objects. The incident light intensity signal indicates the reflected detection light intensity. The input/output interface 103 transmits the rotational angle instruction signal to the electric motor 40 and receives the rotational angle signal from the rotational angle sensor 41.

Figure 8:
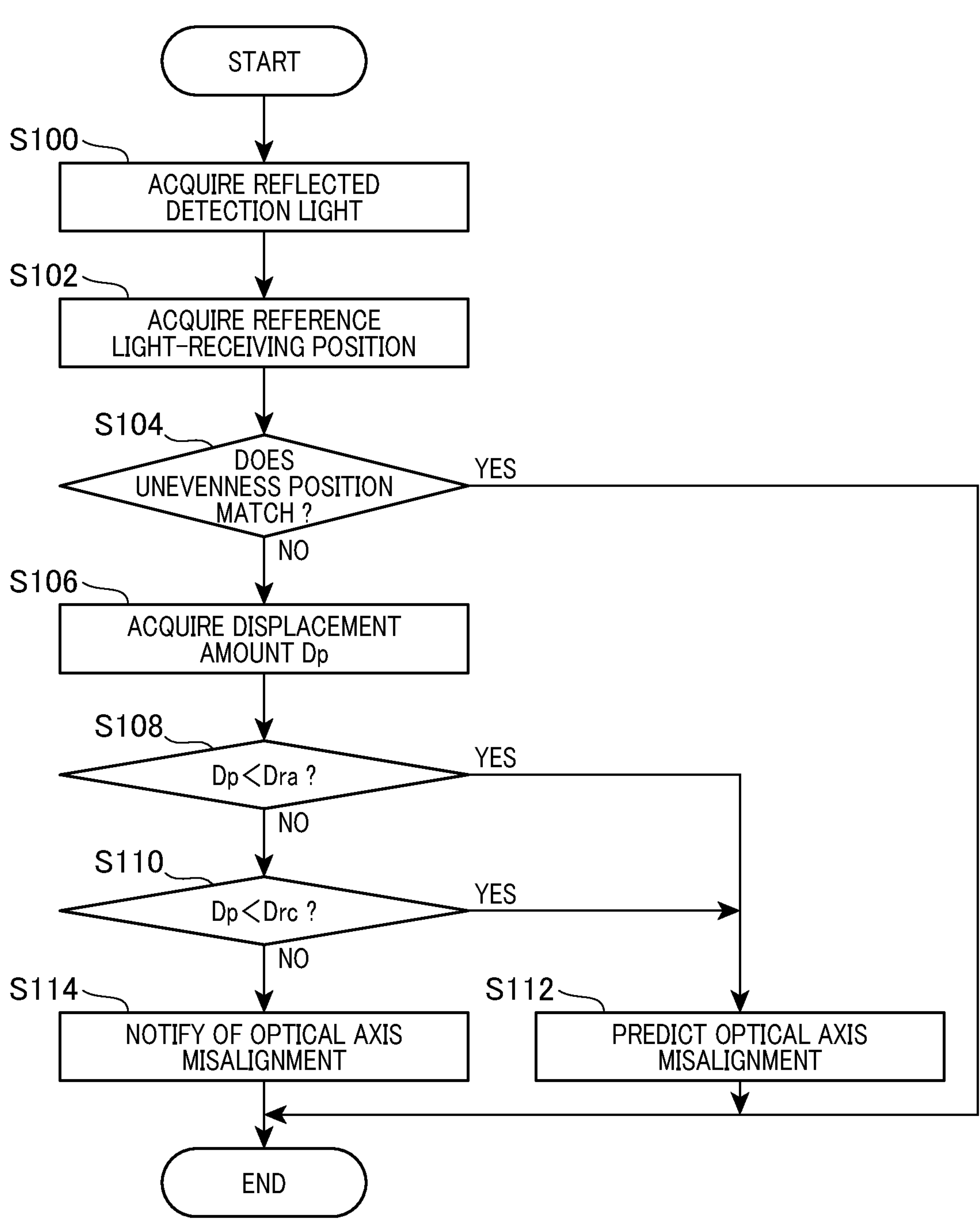
FIG. 8 is a flowchart showing a process flow for determining an optical axis misalignment executed by the optical detection apparatus according to the first embodiment.

The process for determining an optical axis misalignment executed by the optical detection apparatus 10 according to the first embodiment will be described. The process routine shown in FIG. 8 may be executed every time the operation period of the optical detection apparatus 10 passes a predetermined period such as 10 days, 30 days, or two months. When the optical detection apparatus 10 is mounted to the vehicle 50 for use, the process routine may be executed every time the control system of the vehicle is started, every time the start switch is turned on, every time the accumulated travel time of the vehicle 50 passes a predetermined time period, or every time the accumulated travel distance of the vehicle 50 exceeds a predetermined distance. Furthermore, the process routine may be executed at a timing after inspection or repair of the vehicle 50. The process flow shown in FIG. 8 is executed by the CPU 101 by executing the optical axis misalignment determination program Pr1.

The CPU 101 acquires the reflected detection light from the light receiving unit 20 through the input/output interface 103 (step S100). The reflected detection light is incident light that enters the light receiving unit 20 by the reflection of detection light, as the emitted light emitted from the light emitting unit 30, off an object. The reflected light received by the light receiving unit 20, or more specifically, the light-receiving element array 22 includes the light intensity unevenness corresponding to the overlapped regions LP included in the emitted light of the light emitting unit 30 or the unirradiated regions Sp as shown in FIG. 6. The incident light intensity output from the light-receiving pixels 230 that receive the reflected light corresponding to the overlapped regions LP is higher than the incident light intensity output from the light-receiving pixels 230 that receive the reflected light corresponding to the normal region other than the overlapped regions LP and the unirradiated regions Sp. The incident light intensity output from the light-receiving pixels 230 that receive the reflected light corresponding to the unirradiated regions Sp is lower than the incident light intensity output from the light-receiving pixels 230 that receive the reflected light corresponding to the normal region. Thus, the incident light intensity is used to determine whether each light-receiving pixel 230 is receiving the light intensity unevenness. For example, the light-receiving pixel 230 that outputs the incident light intensity that differs from the incident light intensity output from the light-receiving pixel 230 that receives the reflected light corresponding to the normal region by an amount greater than a predetermined judgment difference can be determined as the light-receiving pixel 230 receiving the light intensity unevenness. The position of the light-receiving pixel 230 receiving the light intensity unevenness may be easily determined by assigning position numbers to the light-receiving pixels 230 in advance. Note that, the judgment difference may be sequentially updated, that is, learned, using statistics, such as the mean or median, of the incident light intensity of the reflected light corresponding to the normal region and the statistics, such as the mean or median, of the incident light intensity corresponding to the light intensity unevenness obtained through the use of the optical detection apparatus 10. In this case, the judgment difference is used that reflects the influence of the environment in which the optical detection apparatus 10 is actually used. This improves the accuracy in determining the light-receiving pixel 230 receiving the light intensity unevenness.

The CPU 101 acquires the reference light-receiving region that is prepared in advance from the reference light-receiving region storage area 102*a* of the memory 102 (step S102). The reference light-receiving region is the light-receiving position on the light-receiving element array 22 corresponding to the location of the light intensity unevenness included in the emitted light of the light emitting unit 30. When the optical detection apparatus 10 is installed in a proper position, for example, to the vehicle 50, the reference light-receiving region refers to the positions of the light-receiving pixels 230 that receive the reflected light corresponding to the overlapped regions LP or the unirradiated regions Sp. The positions of the light-receiving pixels 230 that receive the reflected light corresponding to the overlapped regions LP or the unirradiated regions Sp are previously acquired when the optical detection apparatus 10 is installed and are stored as the position numbers in the reference light-receiving region storage area 102*a*. Note that, in the first embodiment, the reference light-receiving region is also referred to as the reference light-receiving position.

The CPU 101 determines whether the position of the light intensity unevenness acquired received from the light receiving unit 20, that is, the detected light-receiving region, that is, the actual light-receiving position, of the overlapped regions LP or the unirradiated regions Sp matches with the reference light-receiving position acquired from the memory 102 (step S104). Specifically, the CPU 101 determines whether the position number of the light-receiving pixel 230 corresponding to the actual light-receiving position matches with the position number of the reference light-receiving position. In response to determining that the actual light-receiving position matches with the reference light-receiving position (step S104: Yes), the CPU 101 determines that an optical axis misalignment has not occurred and terminates the present routine. This is because when the actual light-receiving position matches with the reference light-receiving position, an optical axis misalignment has not occurred in the optical detection apparatus 10. Note that, since the light intensity unevenness may be detected by multiple light-receiving pixels 230, for example, a small position number or a middle position number of the actual light-receiving positions may be compared with the position number of the corresponding reference light-receiving position, or all the position numbers of the actual light-receiving positions may be compared with the position numbers of all the reference light-receiving positions.

In response to determining that the actual light-receiving position does not match with the reference light-receiving position (step S104: No), the CPU 101 acquires a positional displacement amount Dp (step S106). The positional displacement amount Dp is, for example, the difference between a position number RN of the actual light-receiving position and a position number SN of the reference light-receiving position. Alternatively, the physical distance from one end of the light-receiving element array 22 to the center or a reference point in each light-receiving pixel 230 may be associated in advance, and the difference between the distance to the actual light-receiving position and the distance to the reference light-receiving position may be calculated. The CPU 101 determines whether the positional displacement amount Dp is less than an acceptable displacement amount Dra (step S108). In response to determining that the displacement amount Dp is less than the acceptable displacement amount Dra (step S108: Yes), the CPU 101 predicts the time when an optical axis misalignment will occur (step S112) and terminates the present routine. The acceptable displacement amount Dra is a value smaller than an unacceptable displacement amount Drc used for the determination of the occurrence of an optical axis misalignment and is, for example, the displacement amount set as having the possibility of causing an optical axis misalignment within six months based on statistical data. The time when an optical axis misalignment will occur is predicted by calculating the positional displacement amount of the actual light-receiving position per hour or per the number of execution of the present routine using the position information of the actual light-receiving position during execution of the present routine, calculating the positional displacement amount that will occur with the following lapse of time as a predicted positional displacement amount, and calculating the time when the predicted positional displacement amount exceeds the acceptable displacement amount Dra. The predicted time when an optical axis misalignment will occur that has been calculated is stored in the optical axis misalignment predicted time storage area 102*b* of the memory 102. In addition to the storage in the optical axis misalignment predicted time storage area 102*b*, a notification process may be performed that notifies a user of the optical detection apparatus 10 at a timing corresponding to the predicted time of the optical axis misalignment, such as a month later or two weeks later. When the optical detection apparatus 10 is mounted to the vehicle 50, a notification may be made that promotes inspection through an information display on the vehicle 50. Furthermore, the predicted time of the optical axis misalignment stored in the optical axis misalignment predicted time storage area 102*b* may be used as diagnosis information of the optical detection apparatus 10 and may be used for checks and maintenance performed by a mechanic at the timing of periodic inspection. Additionally, the distance the vehicle 50 will travel before the possible occurrence of an optical axis misalignment may be notified using the usage conditions of the vehicle 50, namely, the traveling distance per month or the traveling distance per week.

In response to determining that the positional displacement amount Dp is not less than the acceptable displacement amount Dra, that is, the positional displacement amount Dp is greater than or equal to the acceptable displacement amount Dra (step S108: No), the CPU 101 determines whether the positional displacement amount Dp is less than the unacceptable displacement amount Drc (step S110). In response to determining that the positional displacement amount Dp is less than the unacceptable displacement amount Drc (step S110: Yes), the CPU 101 moves to step S112. In this case, since an unacceptable optical axis misalignment has not occurred yet, a preventive process is executed. In response to determining that the positional displacement amount Dp is not less than the unacceptable displacement amount Drc, that is, the positional displacement amount Dp is greater than or equal to the unacceptable displacement amount Drc (step S110: No), the CPU 101 notifies of the occurrence of an optical axis misalignment (step S114) and terminates the present routine. When the positional displacement amount Dp is greater than or equal to the unacceptable displacement amount Drc, an unacceptable optical axis misalignment has occurred in the optical detection apparatus 10. The unacceptable displacement amount Drc corresponds to the positional displacement amount of the actual light-receiving position corresponding to an unacceptable optical axis misalignment, and the unacceptable optical axis misalignment is, for example, the displacement corresponding to the optical axis misalignment that may decrease the ranging accuracy of the optical detection apparatus 10 to be less than a predetermined accuracy. The predetermined accuracy has, for example, a previously assumed error ratio such as ±5%. The user of the optical detection apparatus 10 is notified of an optical axis misalignment, and when the optical detection apparatus 10 is mounted to the vehicle 50, a notification that promotes prompt inspection may be made through an information display on the vehicle 50 or by sound. Note that, the unacceptable displacement amount Drc is a first determination value, and the acceptable displacement amount Dra is a second determination value smaller than the first determination value.

With the optical detection apparatus 10 according to the first embodiment described above, an optical axis misalignment is determined using the actual light-receiving position of the light intensity unevenness detected by the light receiving unit 20, which includes the light-receiving element array 22 formed by the light-receiving pixels 230, and the reference light-receiving position on the light-receiving element array 22 corresponding to the location of the light intensity unevenness included in the emitted light of the light emitting unit 30. Thus, an optical axis misalignment is determined at an early stage by the optical detection apparatus 10 alone. Additionally, the accuracy in determining an optical axis misalignment is improved. Specifically, the use of multiple light-receiving pixels 230 improves the accuracy in detecting the actual light-receiving position of the light intensity unevenness in units of the light-receiving pixels 230. This improves the accuracy in determining the displacement with respect to the reference light-receiving position. As a result, an optical axis misalignment is detected before the occurrence of an unacceptable optical axis misalignment, which could not be detected with the conventional technique. Thus, the ranging accuracy of the optical detection apparatus 10 is maintained or the decrease in the accuracy is inhibited. In contrast, as shown in FIGS. 4 and 5, since the conventional optical detection apparatus includes the light-receiving pixels 61, which are arranged not to receive the light intensity unevenness, or a large-sized light-receiving pixel 61, the light-receiving position of the light intensity unevenness cannot be determined. Thus, the signal intensity of the detection signal output from the light receiving unit is observed for a long period of time, and an optical axis misalignment is determined for the first time when a decrease in the signal intensity is observed. This takes time for determining an optical axis misalignment, and by the time an optical axis misalignment is determined, the optical axis misalignment is sufficiently large that it significantly decreases the ranging accuracy.

Furthermore, the multiple light-receiving pixels 230 are arranged without a gap in the arrangement direction of the light-emitting elements 32 so as to receive the light intensity unevenness included in the reflected light by the multiple light-receiving pixels 230, or each of the light-receiving pixels 230 is set to a dimension so as to receive the light intensity unevenness included in the reflected light by the multiple light-receiving pixels 230. Thus, the position of the light intensity unevenness is more accurately determined, and the accuracy in determining the displacement amount of the optical axis is improved.

In the above-described embodiment, the reference light-receiving position that was set when the optical detection apparatus 10 was mounted to the vehicle 50 is used. However, the reference light-receiving position, that is, the light-receiving position of the light intensity unevenness on the light-receiving element array 22 when an optical axis misalignment has not occurred may be updated, that is, learned, using the detection result at an early stage after the vehicle 50 started traveling. For example, the statistically processed value, such as the mean or median, of the incident light intensity corresponding to the reflected light and the incident light intensity corresponding to the light intensity unevenness obtained when the vehicle 50 has traveled, for example, 100 km to 500 km may be used. In this case, the reference light-receiving position is set that reflects the actual traveling condition of the vehicle 50 and the installation environment of the optical detection apparatus 10. Thus, for example, by setting the reference light-receiving position reflecting the vibration of the vehicle 50 associated with traveling, an optical axis misalignment is determined excluding or reducing the disturbance caused by the behavior of the vehicle 50.

Second Embodiment

Figure 11:
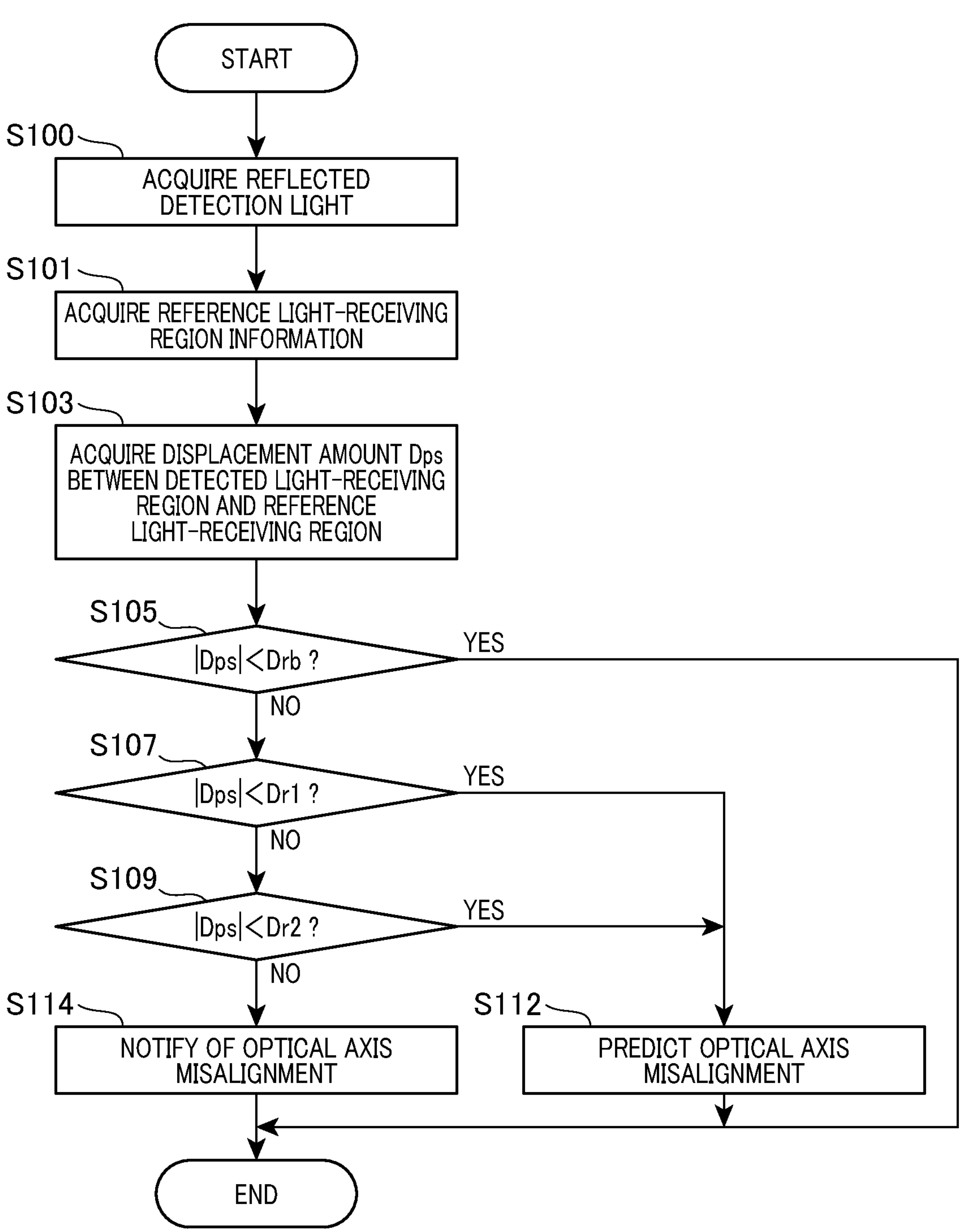
FIG. 11 is a flowchart showing a process flow for determining an optical axis misalignment executed by the optical detection apparatus according to the second embodiment.

An optical detection apparatus of a vehicle according to a second embodiment will be described. The optical detection apparatus of a vehicle according to the second embodiment differs from the optical detection apparatus 10 according to the first embodiment in that it detects an optical axis misalignment in the horizontal direction, an optical axis misalignment in the rotation direction, and a relative optical axis misalignment between the lens and the light-receiving element array 22 in addition to an optical axis misalignment in the vertical direction. Since the structures of the optical detection apparatus according to the second embodiment are identical to the structures of the optical detection apparatus 10 according to the first embodiment, the same reference numerals are given, and descriptions are omitted. The process flow shown in FIG. 11 is executed by the CPU 101 by executing the optical axis misalignment determination program Pr1. In the second embodiment, the term light-receiving region includes not only the position of the light-receiving region, but also the size and area of the light-receiving region. Thus, the reference light-receiving region storage area 102*a* of the memory 102 stores, besides the reference light-receiving position, a reference light-receiving area of the light-receiving region corresponding to the light-intensity unevenness as the reference light-receiving region information.

Figure 9:
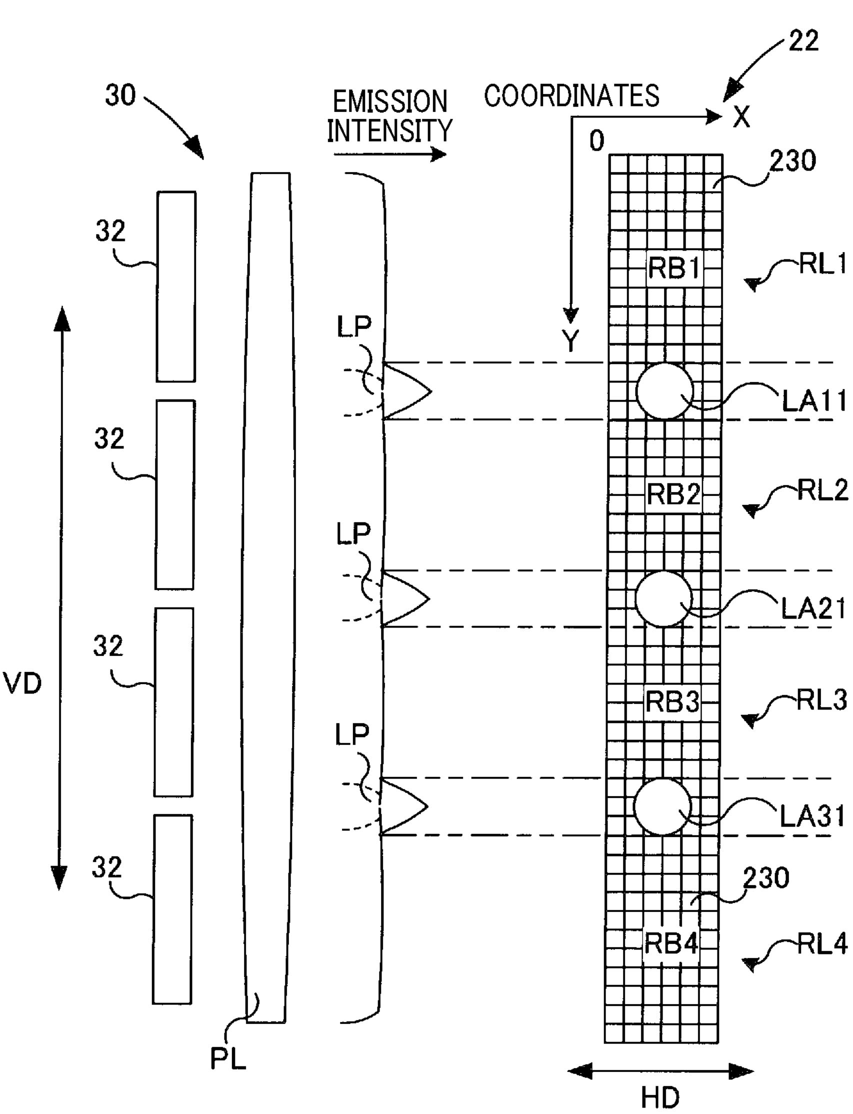
FIG. 9 is an explanatory diagram illustrating the relationship between light-emitting elements, light-receiving pixels, and emission intensity of an optical detection apparatus according to a second embodiment.

In FIG. 6 used for describing an optical axis misalignment in the vertical direction VD, the structure of the light-receiving pixels 230 in the vertical direction VD is explicitly illustrated, and the illustration of the detailed structure of the light-receiving pixels 230 in the horizontal direction is omitted. In contrast, in the second embodiment, an optical axis misalignment in the horizontal direction HD, an optical axis misalignment in the rotation direction, and a relative optical axis misalignment between the lens and the light-receiving element array 22 are also determined. Thus, the light-receiving pixels 230 are arranged in the direction perpendicular to the arrangement direction of the light-emitting elements 32 without a gap. In FIG. 9, the structure of the light-receiving pixels 230 in the horizontal direction is also explicitly illustrated. In other words, FIG. 9 explicitly illustrates that each light-receiving pixel 230 shown in FIG. 6 is constituted by multiple light-receiving pixels 230 in the horizontal direction. In the example shown in FIG. 9, the light-receiving element array 22 includes light-receiving pixels 230 each including one light-receiving element in the vertical direction VD and the horizontal direction HD, that is, 1 by 1 light-receiving pixels 231. Note that, as is described in the first embodiment, the light-receiving pixels 230 used in the light-receiving process are some of the light-receiving pixels 230 in the light-receiving element array 22, which includes the multiple light-receiving elements 220. In FIG. 9, the light-receiving process is executed using the light-receiving pixels 230 constituting four light-receiving blocks RB1, RB2, RB3, and RB4. FIG. 9 schematically illustrates the light-receiving element array 22, and the light-receiving element array 22 may include, for example, 596 by 42 light-receiving elements or other combinations of the number of rows and columns. Furthermore, the light-receiving element array 22 only needs to have the structure that enables detecting an optical axis misalignment in the vertical direction, the horizontal direction, and the rotation direction. That is, the light-receiving element array 22 only needs to have multiple light-receiving pixels 230 in the vertical direction VD and the horizontal direction HD. The light-receiving pixel 230 may include any number of light-receiving elements such as 2 by 2, 1 by 2, or 2 by 1.

In the present embodiment, to facilitate the description, light-receiving regions LA11, LA21, and LA31 having a substantially circular shape are used as the light-receiving regions of the light intensity unevenness. Note that, the term substantially rectangular includes an ellipse, and the light-receiving regions LA11, LA21, and LA31 may have a substantially rectangular shape including a trapezoid, a parallelogram, and a polygon, or other shapes. The position of the center of a circle in the case with the substantially circular shape and the position of the center of gravity in the case with the substantially rectangular shape may be regarded as the center of the light-receiving region, that is, the position of the corresponding light-receiving pixel 230. In the example shown in FIG. 9, the position of each light-receiving pixel 230 in the light-receiving element array 22 can be represented by the X and Y coordinates where the Y direction corresponds to the vertical direction VD and the X direction corresponds to the horizontal direction HD. Note that, the method for determining the light-receiving pixel 230, or the light-receiving position, that is, the light-receiving region of the light-receiving pixel 230 that receives the light intensity unevenness has already been described in the first embodiment.

The light-receiving element array 22 on the left side denoted by reference sign A in FIG. 10 schematically shows the light-receiving state when no optical axis misalignment has occurred in any of the vertical direction, horizontal direction, rotation direction, and optical axis direction. The light-receiving element array 22 on the right side denoted by reference sign B in FIG. 10 schematically shows the light-receiving state when an optical axis misalignment of the rotation axis has occurred and blur is found. The blur is an optical axis misalignment in the optical axis direction of the optical detection apparatus 10 and is one kind of the optical axis misalignment caused by the change in the relative distance in the optical system related to the focus, which is mainly the lens such as the collimator lens PL and the light-receiving element array 22, in the direction parallel to the optical axis. In FIG. 10, the blur is found in the light-receiving regions LA11 and LA21. The blur is found on the light-receiving element array 22 as changes in the size, or the area, of the light-receiving region. When the light-receiving region becomes larger than the light-receiving region without blur that serves as the reference, the relative distance between the collimator lens PL and the light-receiving element array 22 is decreased. Due to the structure of the optical detection apparatus 10, when the light-receiving region becomes smaller than the reference light-receiving region, the relative distance between the collimator lens PL and the light-receiving element array 22 is increased. The increase and decrease in the relative distance between the collimator lens PL and the light-receiving element array 22 with respect to the reference distance is caused by at least one of the positional displacement of the collimator lens PL and the positional displacement of the light-receiving element array 22 in the direction parallel to the optical axis.

Figures 10A, 10B:
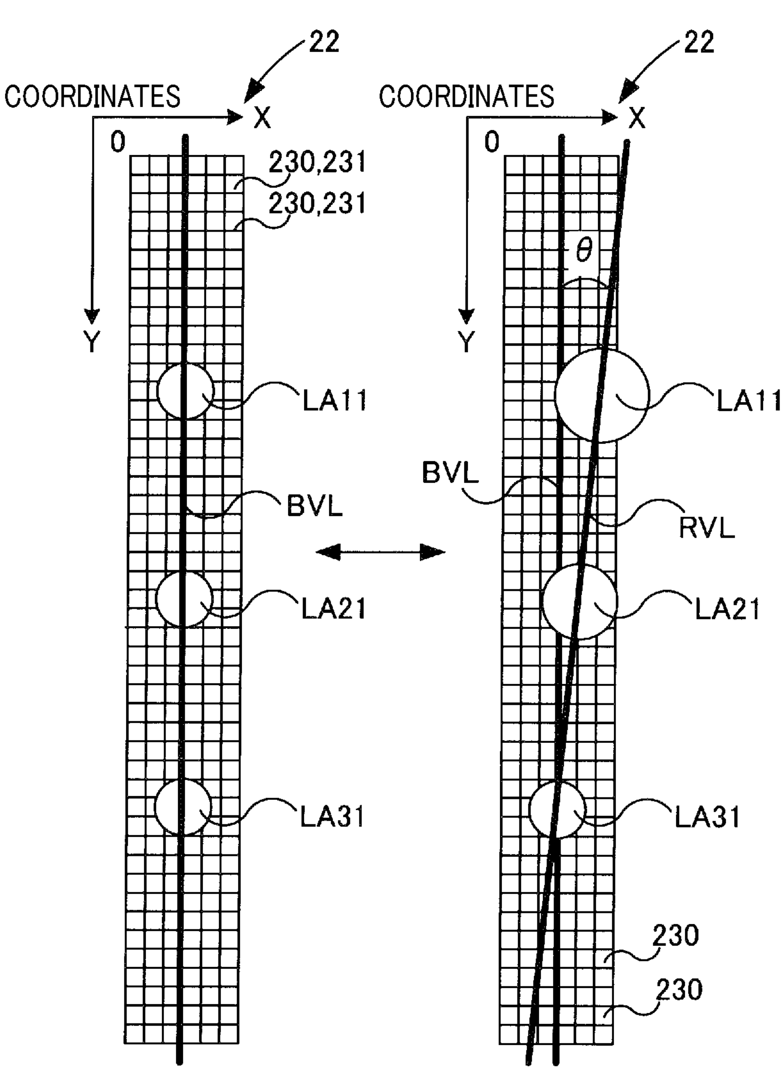
FIGS. 10A to 10B are a joint explanatory diagram illustrating an example of a rotational optical axis misalignment in the optical detection apparatus according to the second embodiment.

In FIG. 10B, the light-receiving region LA11 and the light-receiving region LA21 are displaced in the horizontal direction (X direction) with respect to the reference position (reference straight line BVL) shown in FIG. 10A and have an increased area. The positions of the light-receiving regions LA11 and LA21 shown in FIG. 10B can be acquired as the coordinate positions with the origin (x, y)=(0, 0) at the top left of the light-receiving element array 22. That is, the center of gravity obtained using the coordinate positions of the corresponding light-receiving pixels 230 or the coordinate values corresponding to the center position is acquired as the coordinate positions indicating the positions of the light-receiving regions LA11, LA21, and LA31. The kind of positional displacement and the positional displacement amount (level of positional displacement) of the light-receiving regions LA11, LA21, and LA31 may be acquired by calculating a detected straight line RVL that passes through the centers of the light-receiving regions LA11, LA21, and LA31 shown in FIG. 10B, calculating the straight line that passes through the centers of the light-receiving regions LA11, LA21, and LA31 that serve as the reference shown in FIG. 10A as the reference straight line BVL, and obtaining the geometric positional relationship between both lines. The primary expression representing the reference straight line BVL is previously set, and the primary expression representing the detected straight line RVL may be determined using the coordinate positions of the light-receiving regions LA11 and LA31, or may be calculated by a known linear approximation method such as a least-square method using three points including the light-receiving regions LA11, LA21, and LA31. In the example shown in FIG. 10B, the light-receiving region LA21 is displaced in the horizontal direction, and the detected straight line RVL is rotated by a rotational angle θ with respect to the reference straight line BVL. The axial misalignment amount of the detected straight line RVL with respect to the reference straight line BVL in the horizontal direction HD and the vertical direction VD may be calculated using the coordinate values of the midpoint of the reference straight line BVL and the midpoint of the detected straight line RVL, and the rotational angle θ formed by the detected straight line RVL and the reference straight line BVL may be calculated by a variety of known methods, such as a method that uses, for example, the inner product of two vectors.

Furthermore, the area of the light-receiving region LA11 is larger than the area of the light-receiving region LA21. In this case, an optical axis misalignment in the optical axis direction has occurred in which the relative distance between the collimator lens PL and the light-receiving element array 22 is reduced upward in FIG. 10, that is, toward the direction in which the Y coordinate value approaches 0. The level of blur may be determined based on the predetermined relationship between the size of the area of the light-receiving region and the relative distance between the collimator lens PL and the light-receiving. Alternatively, the level of blur may be determined based on the predetermined relationship between the area of the light-receiving region and the inclination of the detected straight line RVL with respect to the surface of the light-receiving element array 22. The size, or the area, of the light-receiving regions LA11, LA21, and LA31 may be obtained by multiplying the area of a predetermined one of the light-receiving pixels 230 by the number of the light-receiving pixels 230 constituting each of the light-receiving regions LA11, LA21, and LA31. Alternatively, the size, or the area, of the light-receiving regions LA11, LA21, and LA31 may be obtained as the area of a circle approximately calculated with the maximum distance obtained by the coordinate positions of the light-receiving pixels 230 constituting each of the light-receiving regions LA11, LA21, and LA31 serving as the diameter, or as the area of a rectangle approximately calculated with two maximum distances intersecting at right angles serving as two sides of the rectangle. The present embodiment does not require an accurate value of the area and only requires a comparison of the area with a reference area determined by the same calculation method.

The process for determining an optical axis misalignment executed by the optical detection apparatus 10 according to the second embodiment will be described. The process routine shown in FIG. 11 may be executed every time the operation period of the optical detection apparatus 10 passes a predetermined period such as 10 days, 30 days, or two months. When the optical detection apparatus 10 is mounted to the vehicle 50 for use, the process routine may be executed every time the control system of the vehicle is started, every time the start switch is turned on, every time the accumulated travel time of the vehicle 50 passes a predetermined time period, or every time the accumulated travel distance of the vehicle 50 exceeds a predetermined distance. Furthermore, the process routine may be executed at a timing after inspection or repair of the vehicle 50. The process flow shown in FIG. 11 is executed by the CPU 101 by executing the optical axis misalignment determination program Pr1. Note that, those process steps that are the same as the process steps described in the first embodiment are given the same step numbers and will be only briefly described.

The CPU 101 acquires the reflected detection light from the light receiving unit 20 through the input/output interface 103 (step S100). The reflected light received by the light receiving unit 20, or more specifically, by the light-receiving element array 22 includes the light-receiving regions LA11, LA21, and LA31 corresponding to the overlapped regions LP included in the emitted light of the light emitting unit 30 shown in FIG. 9 or the unirradiated regions Sp shown in FIG. 5. Whether each light-receiving pixel 230 is the one receiving the light-receiving region LA11, LA21, or LA31 can be determined using the incident light intensity as described in the first embodiment. The CPU 101 acquires the reference light-receiving position and the reference light-receiving area, which are the reference light-receiving region information prepared in advance, from the reference light-receiving region storage area 102*a* of the memory 102 (step S101). The reference light-receiving position includes the light-receiving positions on the light-receiving element array 22 corresponding to the locations of the light-receiving regions LA11, LA21, and LA31 included in the emitted light of the light emitting unit 30. When the optical detection apparatus 10 is installed in a proper position, for example, to the vehicle 50, the reference light-receiving position includes the positions of the light-receiving pixels 230 that receive the reflected light corresponding to the light intensity unevenness, or more specifically, the coordinate positions corresponding to the center or the center of gravity of the light-receiving regions LA11, LA21, and LA31. The reference light-receiving area includes the areas of the light-receiving regions LA11, LA21, and LA31 on the light-receiving element array 22 corresponding to the locations of the light intensity unevenness included in the emitted light of the light emitting unit 30. When the optical system related to the focus of the optical detection apparatus 10, which is mainly the lens and the light-receiving element array 22, is located in a proper position, the reference light-receiving area is the size of the light-receiving region determined by the number of the light-receiving pixels 230 corresponding to the light-receiving regions LA11, LA21, and LA31. The reference light-receiving position and the reference light-receiving area are previously acquired at a timing when the optical detection apparatus 10 is installed and are stored in the reference light-receiving position storage area 102*a* as the coordinate positions (x, y) and values of the area.

The CPU 101 acquires a displacement amount Dps between the detected light-receiving region acquired received from the light receiving unit 20 and the reference light-receiving region acquired from the memory 102 (step S103). The displacement amount Dps is an index representing the displacement of the optical axis and, in the present embodiment, includes at least both the positional displacement amount and the difference in the size and area. The positional displacement amount may be acquired as, for example, the difference between the coordinate position corresponding to the center or the center of gravity of the detected light-receiving region and the coordinate position of the reference light-receiving position. As mentioned above, the positional displacement amounts in the horizontal direction HD and the vertical direction VD are each acquired as the difference in the coordinate values of the midpoints of the detected straight line RVL and the reference straight line BVL in the X direction and the Y direction, and the rotational displacement amount about the optical axis is acquired as an internal angle or an external angle between the detected straight line RVL and the reference straight line BVL. Furthermore, the optical axis misalignment of the present embodiment includes the relative positional displacement between the collimator lens PL and the light-receiving element array 22 in the optical axis direction as mentioned above. Such relative positional displacement is caused by the fluctuation of the relative distance between the collimator lens PL and the light-receiving element array 22 and is exhibited as the difference, or the change, in the size of the detected light-receiving region. Thus, the difference between the area of the reference light-receiving region and the area of the detected light-receiving region is calculated as the index representing the displacement amount. Each displacement amount in the present embodiment does not necessarily have to be the difference and may be the ratio of the value of the actually received light to the reference value.

The CPU 101 determines whether the displacement amount Dps is within an acceptable range (step S105). Specifically, the CPU 101 determines whether the absolute value of the displacement amount Dps is smaller than a predetermined reference displacement amount Drb, that is, whether $|Dps|<Drb$. The reference displacement amount Drb corresponds to the positional displacement amount small enough to determine that the detected light-receiving region and the reference light-receiving region are the same or substantially the same in the first embodiment. In response to determining that the absolute value of the displacement amount Dps is smaller than the reference displacement amount Drb (step S105: Yes), the CPU 101 determines that an optical axis misalignment has not occurred and terminates the present routine. This is because when the absolute value of the displacement amount Dps between the detected light-receiving region and the reference light-receiving region is smaller than the reference displacement amount Drb, an optical axis misalignment has not occurred in the optical detection apparatus 10 or it may be considered that an optical axis misalignment has not occurred in the optical detection apparatus 10.

In response to determining that the absolute value of the displacement amount Dps is not smaller than the reference displacement amount Drb, that is, $|Dps|\geq Drb$ (step S105: No), the CPU 101 determines whether the absolute value of the displacement amount Dps is smaller than a first reference displacement amount Dr1, that is, $|Dps|<Dr1$ (step S107). In response to determining that the displacement amount Dps is less than the first reference displacement amount Dr1 (step S107: Yes), the CPU 101 predicts the time when an optical axis misalignment will occur (step S112) and terminates the present routine. The first reference displacement amount Dr1 is a value greater than the reference displacement amount Drb and smaller than a second reference displacement amount Dr2 used for determining that an optical axis misalignment has occurred. For example, the first reference displacement amount Dr1 is the displacement amount set as having the possibility of causing an optical axis misalignment within six months based on statistical data.

In response to determining that the absolute value of the displacement amount Dps is not smaller than the first reference displacement amount Dr1, that is, $|Dps|\geq Dr1$ (step S107: No), the CPU 101 determines whether the absolute value of the displacement amount Dps is smaller than the second reference displacement amount Dr2, that is, $|Dps|<Dr2$ (step S109). In response to determining that the displacement amount Dps is less than the second reference displacement amount Dr2 (step S109: Yes), the CPU 101 moves to step S112. In this case, since an unacceptable optical axis misalignment has not occurred yet, a preventive process is executed. In response to determining that the absolute value of the displacement amount Dps is not smaller than the second reference displacement amount Dr2, that is, $|Dps|\geq Dr2$ (step S109: No), the CPU 101 notifies of the occurrence of an optical axis misalignment (step S114) and terminates the present routine. When the positional displacement amount Dp is greater than or equal to the unacceptable displacement amount Drc, an unacceptable optical axis misalignment has occurred in the optical detection apparatus 10. The second reference displacement amount Dr2 corresponds to the positional displacement amount of the detected light-receiving region corresponding to the unacceptable optical axis misalignment, and the unacceptable optical axis misalignment is, for example, the displacement corresponding to the optical axis misalignment that may decrease the ranging accuracy of the optical detection apparatus 10 to be lower than a predetermined accuracy. The predetermined accuracy has, for example, a previously assumed error rate such as ±5%. The user of the optical detection apparatus 10 is notified of an optical axis misalignment, and when the optical detection apparatus 10 is mounted to the vehicle 50, a notification that promotes prompt inspection may be made through an information display in the vehicle 50 or by sound. Note that, the second reference displacement amount Dr1 is a first determination value, and the first reference displacement amount Dr1 is a second determination value.

In addition to a variety of advantages achieved by the optical detection apparatus 10 according to the first embodiment, the optical detection apparatus 10 according to the second embodiment described above further improves the accuracy in determining an optical axis misalignment by determining the optical axis misalignment in the horizontal direction and the vertical direction, the optical axis misalignment in the rotation direction about the optical axis, and the optical axis misalignment in an orthogonal axis direction that is orthogonal to the optical axis. The further improvement in the accuracy in determining an optical axis misalignment increases the yield of the optical detection apparatus 10, improves the accuracy in analyzing the optical axis misalignment over time, and further improves the prediction of the time when the maintenance of the optical detection apparatus 10 will be required. Note that, the orthogonal axis that is orthogonal to the optical axis is an imaginary orthogonal axis that is orthogonal to the optical axis in the optical system related to the focus, which is mainly the lens or the light-receiving element array 22, and the optical axis misalignment in the orthogonal axis direction causes blur associated with changes in the relative distance between the lens and the light-receiving element array 22. The variety of manners in which an optical axis misalignment occurs as described in the second embodiment may be detected by any combinations or by all combinations.

Figure 12:
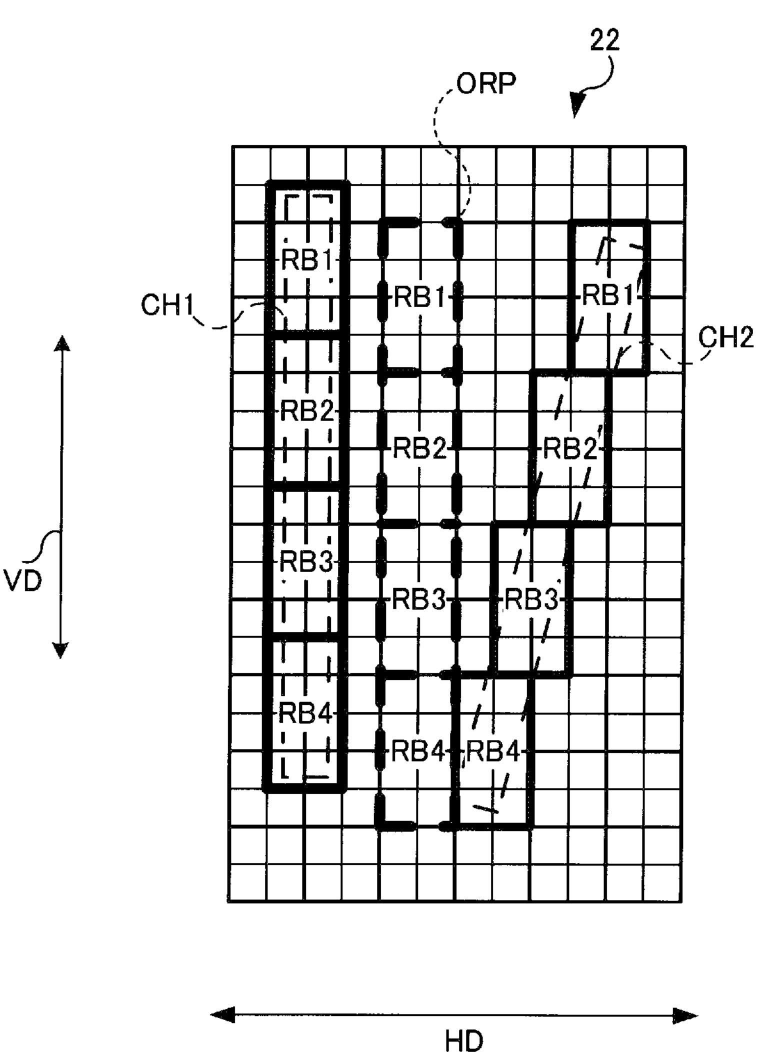
FIG. 12 is an explanatory diagram illustrating an example in which the light-receiving pixels are changed in the optical detection apparatus according to the second embodiment.

In the above description, an optical axis misalignment is only notified or the occurrence of an optical axis misalignment is only predicted. However, the optical detection apparatus 10 may be configured to be able to change the light-receiving pixels 230 used for the light-receiving process in accordance with the manner in which the detected optical axis misalignment has occurred. That is, since the displacement amount of the optical axis is detected in more detail, the light-receiving pixels used for the light-receiving process can be changed appropriately. The configuration may be modified in such a manner that, for example, a person changes the setting of the light-receiving pixels 230 used for the light-receiving process performed by the optical detection apparatus 10, or the optical detection apparatus 10 itself changes the setting of the light-receiving pixels 230 in accordance with the state of an optical axis misalignment, that is, depending on whether an optical axis misalignment has occurred in the horizontal direction, the vertical direction, or about the optical axis. The change in the light-receiving region will be specifically described using FIG. 12. In FIG. 12, a light-receiving region ORP that serves as the reference, that is, the light-receiving region ORP used before the occurrence of an optical axis misalignment is shown by a broken line. In each of the above-described embodiments, the light-receiving region ORP is configured by the four light-receiving blocks RB1, RB2, RB3, and RB4. When an optical axis misalignment about the optical axis does not exist, and an optical axis misalignment has occurred in the horizontal direction HD and the vertical direction VD, causing the light intensity unevenness to appear in a region CH1 shown by a broken line, the light-receiving pixels 230 corresponding to the region CH1 are used for the light-receiving process. In this case, the light-receiving blocks RB1, RB2, RB3, and RB4 are selected so as to have the same matrix arrangement as those configuring the light-receiving region ORP. When an optical axis misalignment in the rotation direction occurs with the optical axis serving as the center of rotation, and the light intensity unevenness appears in a region CH2 shown by a broken line, the light-receiving pixels 230 corresponding to the region CH2 are used for the light-receiving process. In this case, since the region CH2 is inclined with respect to the vertical direction VD and the horizontal direction HD, the light-receiving blocks RB1, RB2, RB3, and RB4 are selected to match or be similar to the region CH2 in a step-like shape, so that the light-receiving region corresponding to the region CH2 is set. As described above, when the light-receiving region ORP is formed by multiple light-receiving blocks, even if an optical axis misalignment occurs in the horizontal direction, the vertical direction, or about the optical axis, the light-receiving region can be changed in accordance with the optical axis misalignment. This inhibits or prevents the decrease in the detection accuracy of the optical detection apparatus 10. As a result, the detection accuracy of the optical detection apparatus 10 is maintained for a longer period of time than before. Note that, since an optical axis misalignment associated with the change in the relative distance, that is, the relative position between the lens and the light-receiving element array 22 detected based on blur requires hardware correction, it is generally corrected by maintenance personnel. If at least one of the lens and the light-receiving element array 22 includes an actuator, the relative distance between the lens and the light-receiving element array 22 may be corrected by operating the actuator.

Other Embodiments (1) In each of the above embodiments, both the calculation of the predicted time of the occurrence of an optical axis misalignment, and the determination and notification of an optical axis misalignment are performed. However, only either the calculation or the determination and notification may be performed. If only the calculation of the predicted time of the occurrence of an optical axis misalignment is executed, it is possible to take measures before the occurrence of an optical axis misalignment by providing a notification corresponding to the predicted time that has been calculated. Even if only the determination and notification of an optical axis misalignment are performed, the determination of an optical axis misalignment is made at an early stage with the optical detection apparatus 10 alone. In the case in which both the calculation of the predicted time of the occurrence of an optical axis misalignment and the determination and notification of an optical axis misalignment are performed, even if measures are not taken corresponding to the predicted time that has been calculated, the optical axis misalignment that has occurred is determined at an early stage and notified.

(2) In each of the above embodiments, the optical detection apparatus 10 that executes the process for determining an optical axis misalignment is achieved with the CPU 101 executing the optical axis misalignment determination program Pr1, but may be achieved by means of hardware using a pre-programmed integrated circuit or a discrete circuit. That is, the control unit and the method of each of the above embodiments may be achieved by a dedicated computer that includes a processor and a memory programmed to execute one or more functions implemented as computer programs. Alternatively, the control unit and the method disclosed in the present disclosure may be achieved by a dedicated computer provided by configuring a processor with one or more dedicated hardware logic circuits. Alternatively, the control unit and the method disclosed in the present disclosure may be achieved by one or more dedicated computers configured by combining a processor and a memory programmed to execute one or more functions and a processor configured by one or more hardware logic circuits. Additionally, the computer program may be stored in a non-transitory, tangible computer-readable storage medium as an instruction executed by a computer.

Although the present disclosure has been described on the basis of the embodiments and modifications, it should be understood that the embodiments of the invention described above are given to facilitate understanding of the present disclosure and do not limit the present disclosure. The present disclosure may be changed or improved without departing from the spirit and scope of the present disclosure, and their equivalents are included in the present disclosure. For example, embodiments corresponding to the technical characteristics of each embodiment disclosed in Summary of the Invention and the technical characteristics of the modifications may be replaced or combined as required to solve part or all of the above-described problem or achieve part or all of the above-described advantages. Unless the technical characteristics are described as essential in the present description, the technical characteristics may be omitted as required.

What is claimed is:

1. An optical detection apparatus comprising:

a light emitting unit including a plurality of light-emitting elements;

a light receiving unit including a light-receiving element array formed by a plurality of light-receiving pixels, the light-receiving pixels receiving reflected light corresponding to emitted light of the light emitting unit;

a storage unit configured to store a reference light-receiving region on the light-receiving element array corresponding to a location of occurrence of light intensity unevenness included in the emitted light of the light emitting unit; and a determining unit configured to determine an optical axis misalignment using a displacement between the reference light-receiving region and a detected light-receiving region of light intensity unevenness included in the reflected light of the emitted light on the light-receiving element array, the light intensity unevenness being formed due to a difference in emission intensities caused by an overlapped region where irradiated regions of light emitted from the plurality of light-emitting elements overlap, wherein the determining unit is configured to determine the optical axis misalignment based on a comparison between a location of the detected light-receiving region corresponding to the overlapped region and a location of the reference light-receiving region corresponding to the location of occurrence of the light intensity unevenness.

2. The optical detection apparatus according to claim 1, wherein the plurality of light-receiving pixels are arranged without a gap in an arrangement direction of the plurality of light-emitting elements so as to receive the light intensity unevenness included in the reflected light by the plurality of light-receiving pixels.

3. The optical detection apparatus according to claim 1, wherein the plurality of light-receiving pixels are arranged without a gap in a direction orthogonal to an arrangement direction of the plurality of light-emitting elements so as to receive the light intensity unevenness included in the reflected light by the plurality of light-receiving pixels.

4. The optical detection apparatus according to claim 1, wherein each of the plurality of light-receiving pixels has a dimension such that the light intensity unevenness included in the reflected light is received by the plurality of light-receiving pixels.

5. The optical detection apparatus according to claim 1, wherein the determining unit is configured to determine the detected light-receiving region using a difference between a light intensity of the light intensity unevenness and a light intensity of the reflected light.

6. The optical detection apparatus according to claim 5, wherein the determining unit is configured to learn the difference using the light intensity of the light intensity unevenness and the light intensity of the reflected light.

7. The optical detection apparatus according to claim 2, wherein the determining unit is configured to:

determine that an optical axis misalignment has occurred when an amount of displacement between the reference light-receiving region and the detected light-receiving region is greater than a predetermined first determination value; and execute a process for notifying of the optical axis misalignment.

8. The optical detection apparatus according to claim 7, wherein the determining unit is configured to:

calculate a predicted time at which an optical axis misalignment will occur when the amount of displacement between the reference light-receiving region and the detected light-receiving region is greater than a predetermined second determination value, the second determination value being smaller than the first determination value.

9. The optical detection apparatus according to claim 1, wherein the determining unit is configured to:

calculate a predicted time at which an optical axis misalignment will occur when an amount of displacement between the reference light-receiving region and the detected light-receiving region is greater than a predetermined second determination value, the second determination value being smaller than a first determination value, the first determination value being a determination value of an optical axis misalignment.

* * * * *